Jan. 26, 1971    R. J. FERRAN    3,557,621

VARIABLE CAPACITANCE DETECTING DEVICES

Filed July 7, 1969

United States Patent Office 3,557,621
Patented Jan. 26, 1971

3,557,621
VARIABLE CAPACITANCE DETECTING DEVICES
Robert J. Ferran, Framingham, Mass., assignor to C.G.S. Scientific Corporation, Inc., Waltham, Mass., a corporation of Pennsylvania
Filed July 7, 1969, Ser. No. 839,378
Int. Cl. G01l 9/12
U.S. Cl. 73—398                10 Claims

ABSTRACT OF THE DISCLOSURE

Variable capacitance detecting devices are described in which a conductive member insulated from the fixed and moveable electrodes is disposed within the device across the leakage path of one or more of the electrodes. An amplifier of unity gain is connected to establish the same instantaneous voltage and phase on the conductive member as that on the electrode.

Where the electrodes are within a housing from which leads are fed through to exterior circuitry, the lead from the conductive member surrounds the lead from one of the electrodes.

A pressure transducer for non-conductive fluids is shown in which the conductive member is a conductive coating applied to a dielectric plate, surrounding the fixed electrode which is also carried by the plate. Two of these plates are mounted on opposite sides of a diaphragm to achieve a balanced transducer, and leads from the conductive bands pass through apertures in the plate.

---

This invention relates to variable capacitance detecting devices used to indicate variations in parameters such as forces, movements, positions and pressures. Of particular concern are capacitive pressure transducers.

In such devices a moveable conductive electrode or diaphragm is disposed adjacent a fixed electrode, the two electrodes being insulated from each other. Change in capacitance between the electrodes produced by relative displacement thereof is sensed in a suitable circuit, e.g. a bridge circuit. In certain instances the detecting device is of balanced construction with a fixed electrode on each side of the diaphragm, and all of the electrodes are confined within a housing.

Devices of this construction, e.g. pressure sensing capacitors which measure differentials in fluid pressure, have been detrimentally affected by the presence of high humidity, and in other instances have been subject to zero instability or have required careful or expensive construction.

Objects of the invention are to overcome these problems, to reduce electrical errors in the output signal caused by variations in humidity or due to ageing or inaccuracies of construction, and to improve zero stability.

Other objects are to provide means for relaxing the manufacturing tolerances and the requirements of electrical properties of various parts of such devices and to avoid the necessity of maintaining the device at an elevated temperature when moisture is present.

Another object is to provide an improved low frequency variable capacitance transducer operable at frequencies of the order of 10,000 Hz.

The invention features a variable capacitance detecting device, and especially a pressure transducer, in which a conductive member insulated from both the fixed and moveable electrodes is disposed in the device across the leakage path that extends from one of the electrodes to adjacent portions of the device. An amplifier of unity gain having its input electrically connected, either directly or indirectly to one of the electrodes has its output connected to establish substantially the same instantaneous voltage and phase on the conductive member as that on the respective electrode.

Preferred embodiments of the invention feature conductive rings or surface bands surrounding the fixed electrodes and having surfaces lying along the surface leakage paths from the fixed electrodes. Preferably a band is secured to the surface of a dielectric plate, while a second similar band is secured to the opposite side of the plate.

In preferred embodiments where the electrodes are enclosed in a conductive housing, the lead from the conductive member and the lead from an electrode pass through a common terminal, the lead from the conductive member surrounding the latter and insulated therefrom.

Other objects, features, and advantages will appear from the following description of preferred embodiments of the invention taken in connection with the attached drawings thereof, in which.

Figure 1:
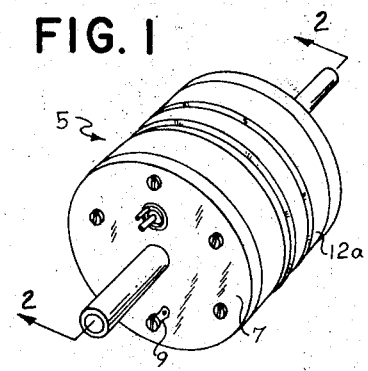
FIG. 1 is a perspective view of a preferred embodiment of a transducer according to the invention.
Figure 3:
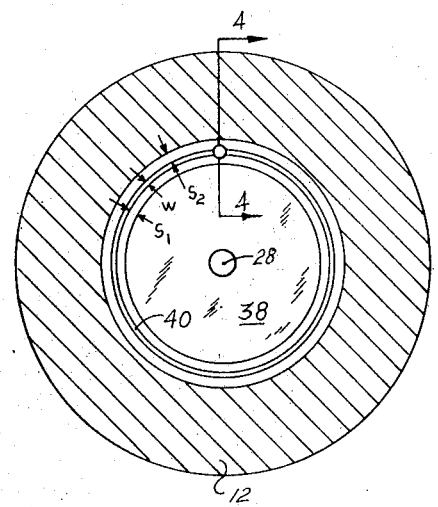
FIG. 3 is a cross section taken along line 3—3 of FIG. 2.
Figure 4:
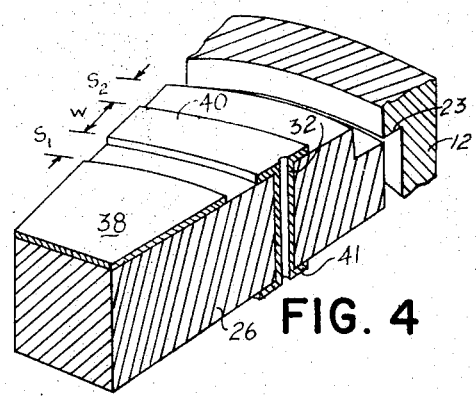
FIGS. 4 and 5 are partially broken away perspective views respectively of a portion of the fixed elecrode assembly and of the terminal assembly of the preferred embodiment.

Referring to the drawings, a differential pressure sensing instrument of balanced construction is shown symmetrical about a plane through the diaphragm. It will be convenient to refer to elements of the transducer on one side only.

Housing or casing 5 has a header 7 which has a central pressure tube 10 for connection to a source of pressure through a suitably insulated conduit. The housing 5 is fabricated from two identical parts 12 and 12a which are conductive metal cylindrical sections that serve to tension and support diaphragm 14. A terminal lug 9 is secured to the casing.

Diaphragm 14 is formed of metal and is under uniform tension, e.g. a stress of approximately 60,000 p.s.i. The marginal portion of the diaphragm is welded between the two housing sections 12 and 12a as shown at 20. The fixed electrode 38 in the form of a circular thin conductive coating is carried on the conic surface of a ceramic disc 26 of appropriate dielectric quality, fixed against a positioning shoulder 23 by locking spring 24. The ceramic disc has a center opening 28 admitting air between the fixed electrode and the diaphragm and providing a passage for the electrode lead 30. This coating can be suitably formed and intimately secured to the disc, e.g. by vapor deposition techniques or by painting followed by firing in a kiln.

A thin annular band 40 of conductive coating is secured to the conic surface of ceramic disc 26, spaced outwardly from the circumferential edge of the fixed electrode 38 and spaced inwardly from the outer edge 43 of the ceramic disc 26 which lies adjacent the housing ring 12. A second conductive annular band 41 is provided on the opposite side of the ceramic disc, surrounding and spaced from electrode lead 30.

Preferably these coatings are formed of gold or nickel, however other metals may be used. Typically the band 40 may have width W of $\frac{1}{32}''$, spaced $\frac{1}{16}''$, $S_1$, from the fixed electrode 38 and $\frac{1}{16}''$, $S_2$, from the housing ring 12.

The ceramic disc contains another hole 32 to provide passage for the electrical connection to the conductive band 40.

Figure 5:
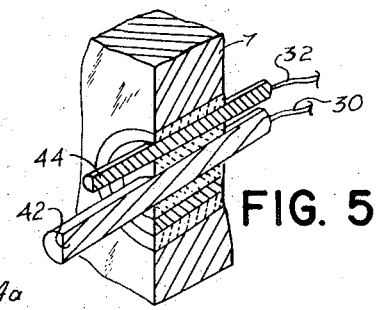
Figure 2:
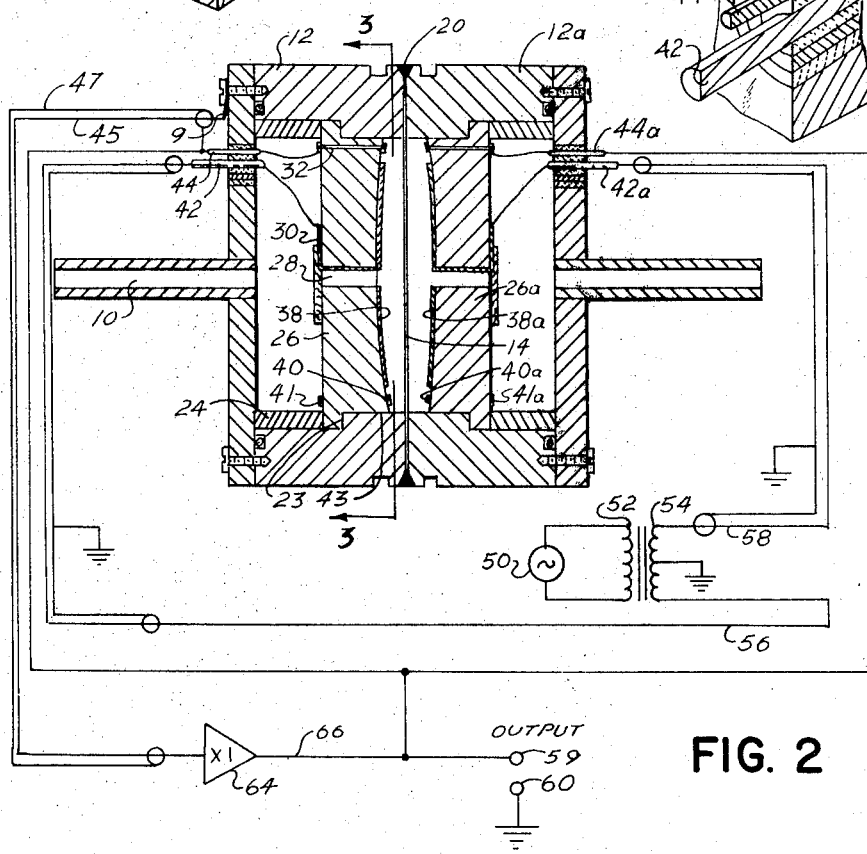
FIG. 2 is a longitudinal section of the transducer of FIG. 1 taken along line 2—2, with a schematic representation of detecting and amplifying circuits.

As seen in FIG. 2, the fixed electrode 38 is connected to terminal 42 by lead 30 which extends (e.g. in the form of a coating) through aperture 28 in the dielectric disc. Similarly conductive band 40 is connected through an aperture 32 in the dielectric disc to terminal 44, and band 41 on the opposite side of dielectric plate 26 is also connected to this terminal. Terminal 44 is of tubular construction (see FIG. 5) and is insulated from terminal 42 which it surrounds as well as being insulated through header wall 7.

Referring to FIG. 2 the associated circuit of this embodiment comprises an oscillator 50 supplying a source of voltage to the primary windings of transformer 52. The secondary windings 54 of the transformer are connected by suitably shielded leads 56 and 58 to the fixed electrode terminals 42 and 42a and thus through leads to the fixed electrodes 38 and 38a, respectively. The secondary winding 54 is grounded at the center tap 63 and applies an equal voltage to each of these electrodes of phase differing by 180°. The unity gain amplifier 64 which may consist e.g. of an emitter follower or cathode follower circuit has its input connected through lead 45 (suitably shielded as indicated at 47) to terminal lug 9 and thus through the conductive path of the housing 12, to diaphragm 14. Lead 66 connected to the output terminal of the amplifier branches at junction 68 to connect both conductive band terminals 44 and 44a to the amplifier output. An indicator not shown such as an A.C. voltmeter or preferably a phase-senstitive detector, is connected across output terminals 59 and 60 to measure the output signal of the amplifier.

The circuit operates in a routine manner in that at zero pressure differential across the diaphragm the spacing between the diaphragm and each fixed electrode is equal. The voltage indicator connected to the output 59, 60 of the amplifier will read zero (with suitable initial adjustment to compensate for minor stray capacitances, etc.). This is due to the fact that the equally divided secondary windings of the transformer supply an equal voltage to each fixed electrode and the capacitances of the two capacitors are equal, causing no voltage to appear on the central diaphragm and consequently no signal to be transmitted by the amplifier. With change in the pressure differential the diaphragm is displaced and the voltage indication of the diaphragm will increase due to unequal capacitances existing in the two capacitors caused by unequal spacing. The phase of the voltage relative to the exciting oscillator depends on whether the spacing of a given capacitor is greater than or less than the value which produced zero voltage.

In operation of the novel part of the embodiment, the unity gain amplifier which receives as an input signal the voltage indication of the diaphragm electrode, drives the conductive members 40, 40a, 41, 41a (as well as the terminals 44 and 44a) at the same instantaneous voltage and phase as that of the diaphragm.

The present invention can be regarded as employing the general principle of electrical guarding, known for many decades, but it is here accomplished uniquely in the heart of the operative parts of the pressure transducer as described and is effective to overcome particular problems which I have recognized.

With pressure transducers the capacitor surfaces are exposed to the ambient humidity. This humidity, as do other factors, gives rise to leakage currents. But unlike other leakage currents which may be constant and therefore can be compensated electronically, the humidity-caused leakage currents vary with humidity. Realizing, however, that these leakage currents are confined substantially to the surfaces extending between the electrodes in the frequencies of interest (e.g. on the order of F=10,000 Hz.), I have provided the conductive bands 40, 40a surrounding the fixed electrodes and thus electrically interrupting the surface, to stop such leakage. In other words, in this case the in phase signal on the diaphragm, of interest and to be measured, is a high impedance signal, and any leakage current flowing from the diaphragm to the fixed electrode will be out of phase, in quadrature with the signal of interest, and tending to obscure the desired reading. The conductive members 40, 40a, by virtue of the unity gain amplifier, instantaneously track the diaphragm signal in voltage and phase, and constitute a low impedance voltage source. Thus no current is lost from the diaphragm, its signal can be accurately measured and any leakage occurring between the conductive member and the fixed electrode is of no consequence, because the fixed electrode is driven also by the low impedance transformer which can deliver or accept current without significant change. (At frequencies significantly higher than 10,000 Hz., rather than current leakage, there is a tendency for dielectric absorption in the body of the insulator. This can be viewed as another type of leakage, in the sense in which that general term is used in the claims. The invention similarly combats that type of leakage.)

As variations on this feature, where the signal on the fixed electrode is of interest, the input to the amplifier can be connected to it rather than to the diaphragm, with suitable alteration in the detecting circuit; or where the signals on both the diaphragm electrode and a fixed electrode are of interest, two conductive members, e.g. two concentric spaced apart conductive bands on the ceramic disc each with its own unity gain amplifier connected to the respective electrode may be employed, confining any leakage to the path between these conductive bands.

One effect of the band 41 on the outside face of each of the dielectric discs is similarly to block detrimental surface leakage from the central fixed electrode to the diaphragm structure.

While the conductive members in the form of coated bands are advantageous, e.g. from the point of view of simplicity and low cost, other ring-form members can be employed. One to be mentioned is a solid ring extending between the faces of the dielectric disc which could combat leakage through the body of the dielectric member.

The result of the features illustrated by the preferred embodiment is to permit accurate pressure readings with the differential transducer in the regions of above 95% relative humidity, closely approaching 100%, even in the presence of substantial pressures. Also at lower humidities improvement in the accuracy of the readings is observed over that of transducers not so equipped.

While this represents a significant improvement in the pressure transducer field, the same principle may find applicability in other variable capacitor detecting devices. Mention is made of displacement detectors in which a fixed electrode mounted on an insulator at a known reference position is employed to detect accurately the position of a tool. A surface on or attached to the tool can be considered as the movable electrode, analagous to the diaphragm. Since the system is exposed to the atmosphere, current leakage of the kind mentioned above can again be a problem and can be combatted as disclosed.

Another effect of the conductive band members important at high as well as low frequencies of operation, is that of combatting stray capacitances within the instrument itself. It is realized that certain losses in performance result from stray capacitance paths extending through the outer edges of the dielectric plate 26, and it is found that the bands, particularly bands on both sides of the dieletcric plate, are effective to combat the stray capacitance between the fixed electrodes 38 and points of attachment of the diaphragm and the adjoining housing structure. Here again a solid ring extending from face to face through the plate would be effective, but in many instances is not necessary.

By defeating these stray capacitances, the levels of the dielectric properties of the plate 26 become of lesser importance permitting less expensive manufacture. While, with age, thermal stress and warping, the stray capacitance pattern would otherwise change, introducing errors, the present provision avoids harm from these effects.

Having the amplifier and leads, a further beneficial use is made thereof, at the feed-through or terminals. Heretofore terminal design has been regarded as extremely critical, especially in balanced transducers for high accuracy pressure readings and the like. It is known that if exactly identical construction of the two transducer halves is achieved, and exactly constant temperature maintained, then many stray capacitances balance out. But terminals that vary in dielectric qualities, or slight difference in the location of the terminals can produce considerable loss in accuracy. The provision of the lead 44 controlled by the output of the amplifier, again has the effect of guarding one electrical side from the other from stray capacitances. The observed result, with pressure transducers, has been to relieve the criticality of the quality and location of the terminals, enabling greater accuracy and lower cost to be achieved.

Numerous variations are within the spirit and scope of the claims.

What is claimed is:

1. In a variable capacitance detecting device responsive to a varying parameter such as force, movement, position or pressure, comprising at least one fixed electrode for disposition adjacent a second electrode the relative position of which may vary in accordance with said parameter, an insulator for insulating said electrodes from each other and circuitry for applying a voltage between said electrodes and detecting the capacitive effect of the spacing therebetween, thereby to obtain an indication of the value of said parameter; the improvement comprising a conductive member within the device insulated from each of said electrodes, said conductive member disposed across the leakage path from one of said electrodes to adjacent portions of said device, and an amplifier of unity gain having its input electrically connected to one of said electrodes and its output connected to said conductive member to establish substantially the same instantaneous voltage and phase on said conductive member as that on said electrode, thereby to guard said electrode.

2. The detecting device of claim 1 wherein said conductive member comprises a ring of conductive material surrounding and spaced from said fixed electrode, a surface of said conductive ring lying along the surface leakage path from the guarded electrode.

3. The detecting device of claim 2 wherein said insulator comprises a dielectric plate, said fixed electrode is secured to a surface of said plate and said conductive member comprises a band of conductive material secured to said surface of said plate.

4. The detecting device of claim 3 wherein a second band similar to said first band is secured to the opposite side of said plate and is similarly connected electrically.

5. The detecting device of claim 3 wherein said insulator plate comprises a round disc mounted on a rigid ring, said fixed electrode and said conductive band comprise metal coatings bonded to the face of said disc that is directed toward said movable electrode.

6. The detecting device of claim 1 wherein said conductive ring and the guarded electrode are mounted within a housing, said circuitry and said amplifier are disposed outside of said housing, the leads from said guarded electrode and said conductive member extending through a common terminal, the lead from said conductive member being hollow and surrounding, in spaced apart relation, the lead from said guarded electrode.

7. In a variable capacitance pressure transducer comprising a housing having a port for admission of air, and mounted therein exposed to said air a fixed electrode and a diaphragm electrode deflectable toward and away from the fixed electrode in response to variations in air pressure, the outer edge of said diaphragm and said fixed electrode secured in a mutually fixed, insulated relationship, circuitry for applying a voltage between said electrodes an detecting the capacitive effect resulting from said deflection, thereby to obtain an indication of the value of said pressure; the improvement comprising a conductive member disposed within said housing and insulated from each of said electrodes, said conductive member disposed across the leakage path along the mounting of one of said electrodes, an amplifier of unity gain having its input electrically connected to one of said electrodes and its output connected to said conductive member to establish substantially the same instantaneous voltage and phase on said conductive member as that on said electrode, thereby to guard said electrode.

8. The variable capacitance pressure transducer of claim 7 wherein there are two fixed electrodes, one on either side of said diaphragm electrode, and there are two of said conductive members, one between the diaphragm and each of said fixed electrodes, both of said conductive members being driven in response to said amplifier.

9. In a differential capacitance pressure transducer comprising a housing of circular cross-section having two ports for admission of fluid and mounted between said ports a round deflectable diaphragm defining two pressure chambers, two fixed electrodes each defining with said diaphragm an electrode pair, each fixed electrode comprising a circular metal layer secured to the face of a dielectric disc, one mounted on each side of said diaphragm with each electrode facing the diaphragm, the transducer adapted for use with circuitry for applying a voltage between said diaphragm and said fixed electrodes and detecting the capacitive effect resulting from said deflection, thereby to obtain an indication of the value of, the pressure difference between said two ports, the improvement comprising a conductive annular band secured to the inner surface of each of said dielectric discs in a surrounding spaced-apart relation to said fixed electrode, and insulated by the outer portion of said disc from the remaining structure of the device, each band thereby disposed across the surface leakage path between the respective fixed electrode and the diaphragm, said band adapted to be connected to an amplifier of unity gain having its input electrically connected to one of the electrodes of the respective pair and its output connected to said conductive band to establish a voltage on each of said conductive bands of substantially the same instantaneous voltage and phase on said conductive member as that on said electrode.

10. The pressure transducer of claim 9 wherein the leads from each of said fixed electrodes and the respective conductive band extend through the housing for connection to said circuitry through a respective common terminal, the lead from said conductive band being hollow and surrounding in spaced apart relation, the lead from the respective fixed electrode.

References Cited
UNITED STATES PATENTS 3,218,863  11/1965  Calvert _____ 73—398

DONALD O. WOODIEL, Primary Examiner

U.S. Cl. X.R.

73—406